United States Patent
Sugikawa

[11] Patent Number: 6,153,027
[45] Date of Patent: Nov. 28, 2000

[54] METHOD OF MANUFACTURING BATTERY CAN-FORMING PLATE, BATTERY CAN-FORMING PLATE MANUFACTURED BY METHOD

[75] Inventor: Hirofumi Sugikawa, Toyonaka, Japan

[73] Assignee: Katayama Special Industries, Ltd., Osaka-fu, Japan

[21] Appl. No.: 09/095,896

[22] Filed: Jun. 11, 1998

[30] Foreign Application Priority Data

Jun. 11, 1997 [JP] Japan .................................. 9-154185

[51] Int. Cl.⁷ ...................................................... C21D 8/04
[52] U.S. Cl. ........................ 148/516; 148/518; 148/529; 148/530; 148/534; 427/191; 427/192
[58] Field of Search ..................................... 428/615, 636, 428/637, 656, 668, 679, 680, 548, 553; 148/518, 529, 530, 534, 516; 429/164, 176, 191, 192

[56] References Cited

U.S. PATENT DOCUMENTS

| | | | |
|---|---|---|---|
| 857,041 | 6/1907 | Edison ..................................... | 429/164 |
| 4,189,522 | 2/1980 | Mori ....................................... | 428/557 |
| 5,587,248 | 12/1996 | Ohmura et al. ......................... | 428/679 |
| 5,603,782 | 2/1997 | Sugikawa et al. ...................... | 148/518 |

FOREIGN PATENT DOCUMENTS 0725453  8/1996  European Pat. Off. .
0741424  11/1996  European Pat. Off. .

OTHER PUBLICATIONS

Patent Abstracts of Japan, vol. 018, No. 128 (C–1174), Mar. 2, 1994 & JP 05 311389 A (Sumitomo Metal Metal Ind Ltd), Nov. 22, 1993.

*Primary Examiner*—Deborah Jones
*Assistant Examiner*—Robert R. Koehler
*Attorney, Agent, or Firm*—Sughrue, Mion, Zinn, Macpeak & Seas, PLLC

[57] ABSTRACT

A method of manufacturing a battery can-forming material, comprising the steps of spreading metal powder on a hot-rolled steel plate (hot coil) or applying said metal powder in the form of paste to a surface thereof; annealing and then rolling the hot-rolled steel plate having the metal powder applied to the surface thereof to form a metal layer consisting of the metal powder on the surface thereof; cold-rolling the hot-rolled steel plate and the metal layer; annealing the hot-rolled steel plate and the metal layer; and rolling the hot-rolled steel plate and the metal layer by a skin pass roller. Instead of forming the metal layer of the metal powder, the metal powder may be plated on the surface of the hot-rolled steel plate.

17 Claims, 8 Drawing Sheets

METHOD OF MANUFACTURING BATTERY CAN-FORMING PLATE, BATTERY CAN-FORMING PLATE MANUFACTURED BY METHOD

BACKGROUND OF THE INVENTION

The present invention relates to a method of manufacturing a battery can-forming plate and the battery can-forming plate manufactured by the method.

Batteries are used as a power source of various kinds of cordless equipments such as personal lap-top computers, cellular telephones, and the like which are widely used in recent years. The space occupied by the batteries is very large. In order to make the portable equipments compact and light, it is necessary to provide them with batteries which are compact and light and yet have a high performance. To this end, battery cans are required to have high capacities. But the outer shapes of the battery cans are specified by the international standard. In order to allow the battery cans to have high capacity, it is necessary to make the thickness thereof small.

A battery can-forming plate is hitherto manufactured by hot-rolling casted slab, then by cold-rolling a resulting hot-rolled steel plate to a required thickness, and then, by plating the cold-rolled steel plate with nickel or other metals.

In another conventional method, after the cold-rolled steel plate is rolled to 1%–3% which is short of a required thickness of a final product, plated and then annealed. Then, the steel plate is rolled to 1%–3% by a skin pass roller to allow the final product to have the required thickness.

The annealing after the plating is performed and the skin pass rolling are intended to form a diffusion layer between iron of the steel plate and the plated metal layer.

In the conventional manufacturing method, because a tin plate (for example, as thin as 0.2 mm–0.25 mm) obtained after the cold rolling is plated, electric resistance is high and thus it is very difficult to make current (current density $A/dm^2$) high in the plating operation. Therefore, in order to increase productivity, it is necessary to use an electrolytic tank as long as tens of meters to hundreds of meters. In this case, much chemicals are required to plate the cold-rolled steel plate, electric equipments are large-sized, and much electric power is consumed. Moreover, because the cold-rolled steel plate is thin, the length thereof per unit weight is great. Thus, the productivity of the conventional manufacturing method is poor.

SUMMARY OF THE INVENTION

The present invention has been made in view of the above-described problem. It is an object of the present invention to form a metal layer on a steel plate, for example, by plating in a short period of time so that a great deal of surface-treating operation can be accomplished in a short period of time and with high productivity.

In order to achieve the object, at first, there is provided a method of manufacturing a battery can-forming plate, comprising the steps of:

spreading metal powder on a hot-rolled steel plate (hot coil) or applying the metal powder in the form of paste to a surface thereof;
annealing and then rolling the plate to form a metal layer consisting of the metal powder on the surface of the steel plate;
cold-rolling the plate;
annealing the plate; and rolling the plate by a skin pass roller.

As above-described, the metal layer can be formed on the surface of the hot-rolled steel plate by spreading metal powder on or applying them in the form of paste to the surface of the steel plate, annealing and then rolling the plate. Because the surface area of the hot-rolled steel plate is smaller than that of a cold-rolled steel plate, the metal layer can be formed in a short period of time and thus the productivity can be enhanced.

More specifically, when the hot-rolled steel plate having a thickness of 1.5 mm is cold-rolled to reduce its thickness to 0.2 mm, the length per unit weight in the cold-rolled steel plate is about 7.5 as great as that of the hot-rolled steel plate. In other words, the surface area of the hot-rolled steel plate is about 1/7.5 times as small as that of the cold-rolled steel plate. That is, the metal layer is formed on the surface of the hot-rolled steel plate at about 1/7.5 times as small as that of the cold-rolled steel plate. Thus, the method allows the metal layer to be formed on the hot-rolled steel plate in a short period of time and with a high productivity.

TABLE 1

|  | thickness | width | (kg/m) | (m/ton) |
|---|---|---|---|---|
| hot-rolled steel plate | 1.5 | 900 | 10.597 | 94.4 |
| cold-rolled steel plate | 0.2 | 900 | 1.413 | 707.7 |

In the present invention, secondly, there is provided a method of manufacturing a battery can-forming plate, comprising the steps of:

plating a surface of a hot-rolled steel plate (hot coil);
annealing and then rolling the plate to form a diffusion layer consisting of iron of the steel plate and a metal plated between the hot-rolled steel plate and the plated metal layer;
cold-rolling the plate;
annealing the plate;
and rolling the plate by a skin pass roller.

That is, when a metal layer is formed by plating the surface of the hot-rolled steel plate instead of forming a metal layer consisting of metal powder on the surface of the hot-rolled steel plate, the metal layer can be formed on the hot-rolled steel plate in a short period of time and with a high productivity, because the surface area of the hot-rolled steel plate is smaller than that of a cold-rolled steel plate.

In the present invention, thirdly, there is provided a method of manufacturing a battery can-forming plate, comprising the steps of:

plating a surface of a hot-rolled steel plate (hot coil);
spreading metal powder on the plated metal layer or applying the metal powder in the form of paste thereto;
annealing and then rolling the plate to laminate a metal layer consisting of the metal powder on the plated metal layer;
cold-rolling the plate;
annealing the plate;
and rolling the plate by a skin pass roller.

The third method in the present invention is combination of the first method and the second method. That is, after the hot-rolled steel plate is plated, the metal layer consisting of metal powder is formed on the plated metal layer. The third method allows the thickness of the plated metal layer to be thin. Further, the metal layer can be easily formed of a metal which is different from a metal of the plated layer and a metal such as aluminum which is difficult to form the plated layer.

Preferably, in the first method or the third method, after the metal layer consisting of the metal powder is formed, annealing is performed again to form a diffusion layer between the hot-rolled steel plate and the metal layer or between the plated layer and the metal layer of metal powder, and then the cold-rolling is performed.

When the diffusion layer is formed between iron of the steel plate and the metal layer or between the plated layer and the metal layer as described above, the degree of the adhesion between the metal layer and the steel plate as well as the plated layer can be enhanced. Further, this method allows rolling to be accomplished at a high rolling percentage without the metal layer being separated from the steel plate in the cold-rolling which is performed subsequently to the formation of the diffusion layer. Therefore, the method allows the thickness of the steel plate to be small and allows the thickness of a battery can-forming plate to be small.

Preferably, in the first, third and fourth manufacturing method, after the metal layer of metal powder is formed, a metal is plated to form plated metal layer, and then annealing is performed again.

Further, preferably after the cold-rolling is performed, plating is performed, and then, annealing and skin pass rolling are performed. That is, after the metal layer consisting of metal powder is formed on the surface of the hot-rolled steel plate, the metal layer is plated or after the cold-rolling is performed, plating is performed. In this manner, it is possible to form a plated layer consisting of a kind of metal different from the kind of the metal forming the metal layer on the surface of the steel plate.

Said metal powder is selected from Ni, Al, In, Ca, Ag, Ge, Co, Sn, Sr, Se, Pb, Ba, Bi, Be, B, Mn, P, Cr, Si, C, Cu, Fe, Zn, La, W, Ti, Mo, and Ga or an alloy thereof or mixture of two or more kind of the metal powders.

When plating is performed, Ni or the following alloys can be preferably used: Ni or an alloy of Ni—Mn, Ni—In, Ni—Ag, Ni—Ge, Ni—Co, Ni—Sn, Ni—Se, Ni—B, Ni—P, Ni—Si, Ni—Fe, Ni—Zn, Ni—La, Ni—W, Ni—Ti, Ni—Mo, Ni—Ga, Co—Mo, Fe—W, and Ag—Sn.

When the metal layer consisting of metal powder is formed on the surface of the hot-rolled steel plate or the plated layer is formed thereon, the rolling rate in the cold-rolling which is subsequently performed is preferably 80%–90%. That is, the hot-rolled steel plate having a thickness of 1 mm–6 mm is formed as a cold-rolled steel plate having a thickness of 0.1 mm–0.8 mm.

It is preferable that the rolling rate, which is carried out to enhance the adhesion between iron of the steel plate and the metal layer, is 0.3%–10%.

The rolling rate of a skin pass rolling which is carried out at the final process is preferably 0.3%–3%.

Further, in the present invention, there is provided a battery can-forming plate manufactured by the manufacturing method according to any one of above-mentioned method.

In the battery can-forming plate, the metal of a metal layer formed on one surface of a steel plate may be different from that of a metal layer formed on the other surface thereof In this case, preferably, a Ni layer or an Ni alloy layer is formed on one surface of the steel plate, and an Al layer is formed on the other surface thereof. Different kinds of metal layers may be laminated one upon another on a surface of the steel plate.

Further, in the present invention, there is provided a battery can formed of the above-described battery can-forming plate. Further, in the present invention, there is provided a battery comprising the above-described battery can.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DESCRIPTION OF THE PREFERRED EMBODIMENTS

The embodiments of the present invention will be described below in detail with reference to drawings.

Figure 1:
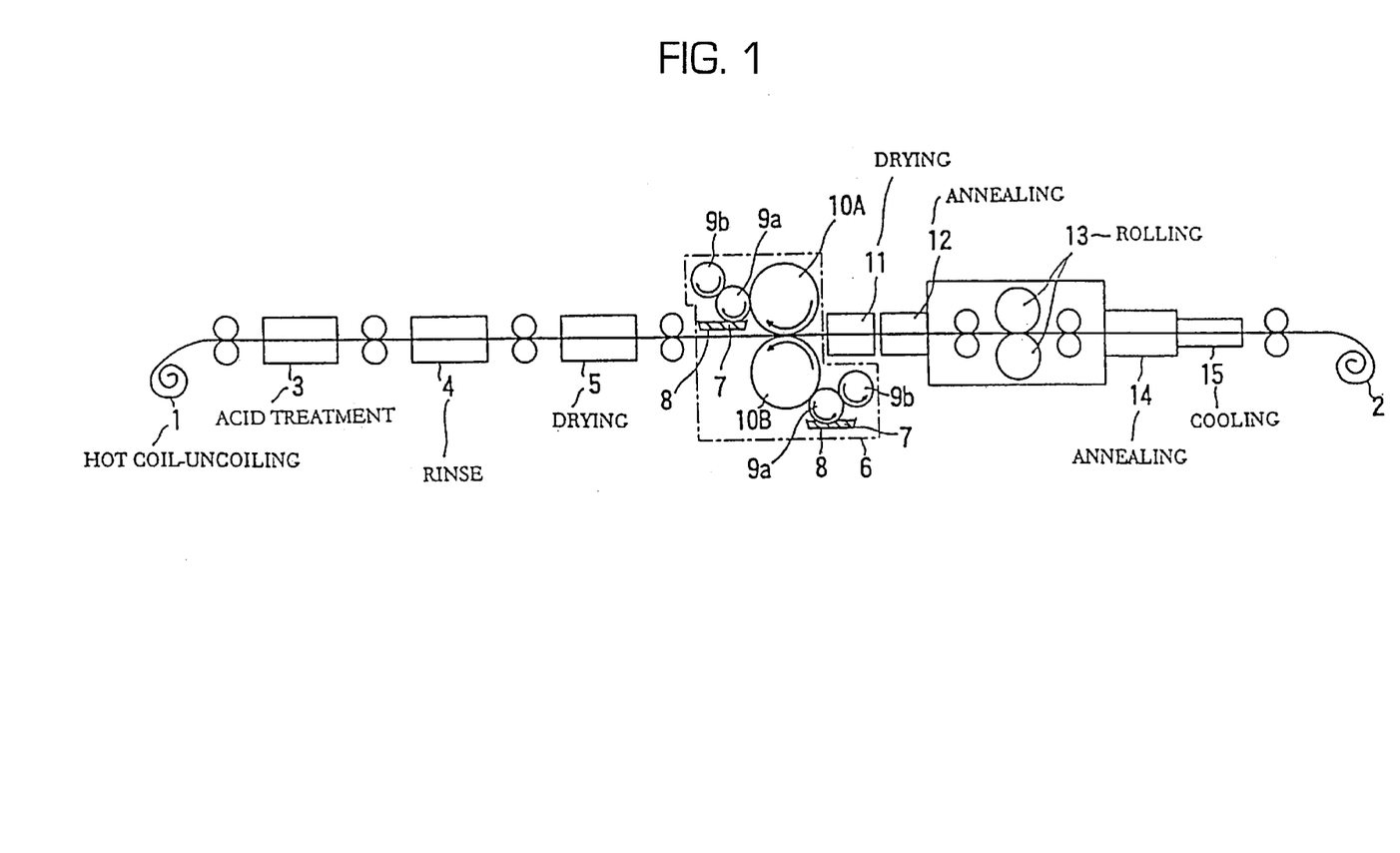
FIG. 1 is a schematic view showing a manufacturing apparatus of a first embodiment of the present invention.

The method of manufacturing the battery can-forming plate of the first embodiment is carried out in the procedure shown in FIG. 1.

As shown in FIG. 1, a hot-rolled steel plate 1, namely a hot coil, is successively transported to each process to form a metal layer (nickel layer in the first embodiment) on both surfaces of the plate 1, then wound as a coil 2.

That is, initially, the hot-rolled plate 1 having a thickness 1 mm–6 mm is passed through an acid treatment device 3 to remove oxidized scale formed on both surfaces thereof. Then, the hot rolled plate 1 is introduced into a rinse tank 4 to wash it. Then, it is introduced into a drying oven 5 to dry it.

Then, the hot rolled plate 1 is successively transported to a roll coater (metal-coating device) 6. In the device, paste 7 consisting of metal powder and screen oil or a binder added thereto is stored in tanks 8 and 8, and rotation rollers 9a and 9a whose lower portions are immersed in the paste are in contact with each of a pair of paste-applying rollers 10A and 10B. The paste-applying rollers 10A and 10B are positioned vertically with a hot coil transport path extending therebetween. Thus, the paste 7 supplied from the tanks 8 and 8 to the surface of the paste-applying rollers 10A and 10B through the rotation rollers 9a and 9a, respectively is applied to the upper and lower surfaces of the hot coil 1. Rolls 9b and 9b are in contact with the rotation rolls 9a and 9a, respectively to drop excess paste.

As the metal powder forming the paste 7, Ni powder having a diameter of 0.3 μm–10 μm or a mixture of the nickel powder and powder of other metal is used in the first embodiment. The metal mixed with the Ni are selected from Al, In, Ca, Ag, Ge, Co, Sn, Sr, Se, Pb, Ba, Bi, Be, B, Mn, P, Cr, Si, C, Cu, Fe, Zn, La, W, Ti, Mo, Ga and alloy thereof or mixture two or more of the metals. Although the powder of these metals may be particulate, scaly or flake-shaped, scaly or flake-shaped metal powder can be preferably used.

The metal powder which can be used to coat both surfaces of the hot rolled plate 1 is not limited to the Ni powder and a mixture of the Ni powder and powder of other metal. For example, the powder of the above-listed metals may be used.

The amount of the above metal powder which is applied to the hot rolled plate 1 is set to 13 g–640 g/m². The metal powder and the screen oil are mixed with each other at 50%–75% of the metal powder and 50%–25% of the screen oil. Ordinary organic binder resin may be used instead of the screen oil.

The method of applying the paste 7 consisting of the metal powder and the screen oil to the hot rolled plate 1 is not limited to the method using the roll coater, but other methods can be appropriately adopted.

After the paste 7 consisting of the metal powder and the screen oil is applied to the upper and lower surfaces of the hot rolled plate 1, the hot rolled plate 1 is introduced into a drying oven 11 and then into an annealing oven 12. In the annealing oven 12, the metal powder is sintered at 600° C.–900° C. for 1–30 minutes in a deoxidizing atmosphere ($N_2$:25%–99%, $H_2$:75%–1%).

The screen oil (or binder) is thermally decomposed and removed by continuous annealing in the annealing oven 12, and Ni (and other metal mixed with Ni) on the both surfaces of the steel plate is reduced by the temperature and the deoxidizing gas.

Then, the plate 1 is passed through a pressure roll 13 at the normal temperature—500° C. to roll them at rolling rate of 0.3%–10%. The rolling enhances the degree of the adhesion of the Ni powder to both surfaces of the iron of the steel plate.

Then, the plate 1 is introduced into an annealing oven 14 to anneal at 600° C.–900° C. for 1–2 minutes to form a diffusion layer between the iron of the steel plate and the Ni layer or the layer of the mixture of Ni and other metal. Then, the plate 1 is taken out from the annealing oven 14 and introduced into a cooling oven 15 to cool so that the temperature of the plate is reduced at 60° C.

The plate having the metal layer formed on both surfaces thereof is wound as a coil 2.

Then, the plate having the metal (Ni) layer formed on its surface and rewound from coil 2 is introduced into a cold rolling device to roll the plate at rolling rate of 80%–90% until the thickness of the plate is 103%–101% of the predetermined thickness of a final product. After the plate is cold rolled, the plate is introduced into an annealing oven for annealing (550° C.–800° C., 24 hours–48 hours) by the batch or for successive annealing (600° C.–900° C., 0.5 minutes–3 minutes) in a deoxidizing atmosphere.

After the plate is annealed, the plate is rolled by a pair of skin pass rollers at rolling rate of 0.3%–3% so that a thickness of the plate, which is used as a battery can-forming plate, become 0.1 mm–0.8 mm required. Then the plate is wound as coil.

Figure 2:
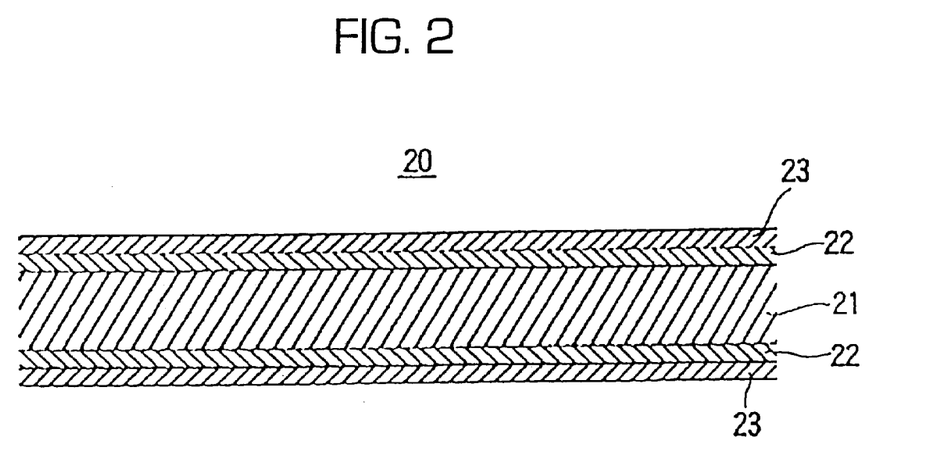
FIG. 2 is an enlarged sectional view showing a battery can-forming plate manufactured by the manufacturing method of the present invention.

Referring to FIG. 2, in the battery can-forming plate 20 which is manufactured by the method, a Ni-plated layer (or layer of mixture of Ni and other metal) 23 is formed on either surface of a steel plate 21 through a diffusion layer 22. The thickness of the steel plate 21 is 0.1 mm–0.8 mm. The thickness of the diffusion layer 22 is 0.1 $\mu$m–3 $\mu$m. The thickness of the Ni-plated layer 23 formed on both surfaces of the steel plate 21 is 1 $\mu$m–5 $\mu$m.

First Experiment

A hot-rolled steel plate (hot coil) having a thickness of 1.66 mm was acid-treated to remove oxidized scale. Then, the hot coil was washed with water and dried. Then, 100 parts by weight of Ni powder (consisting of powder having diameter 2–5 $\mu$m contained at 80% and powder having diameter 0.5 $\mu$m contained at 20%) and 100 parts by weight of screen oil were kneaded to obtain paste. The paste was applied by a roll coater to either surface of the plate such that either surface was coated with 195 g/m² of the Ni powder. Then, the plate was annealed in a deoxidizing gas consisting of $N_2$ at 80% and $H_2$ at 20% for three minutes at 800° C. Then, using a rolling machine, the plate was successively rolled in a reducing atmosphere at 400° C. at a rolling rate of 3%. Thereafter, the plate was annealed again in a reducing atmosphere at 800° C. for two minutes. After the plate was cooled to adjust the temperature of the steel plate to 60° C., it was taken out to the atmospheric air. The thickness of the plate was 1.65 mm at this time.

The hot-rolled plate having a thickness of 1.65 mm and having a Ni layer formed on either surface of the steel plate was cold-rolled at a rolling rate 84.6% to adjust the thickness thereof to 0.255 m. Thereafter, the cold-rolled plate was annealed successively for one minute at 700° C. in a reducing atmosphere. Then, the cold-rolled plate was rolled by a skin pass roller at a rolling rate of 2% to obtain a final product, namely, a battery can-forming plate having a thickness of 0.25 mm. The thickness of the Ni layer was 2.9 $\mu$m and that of the diffusion layer was 1.2 $\mu$m.

Second Experiment

Using the same manufacturing method as that of the first experiment and changing the kind of metal powder of the first experiment, a battery can-forming plate was manufactured. Metal powder consisting of Ni:97.9%, Fe:1.0%, Co:0.5%, C:0.2%, and Si:0.4% was used.

Figure 3:
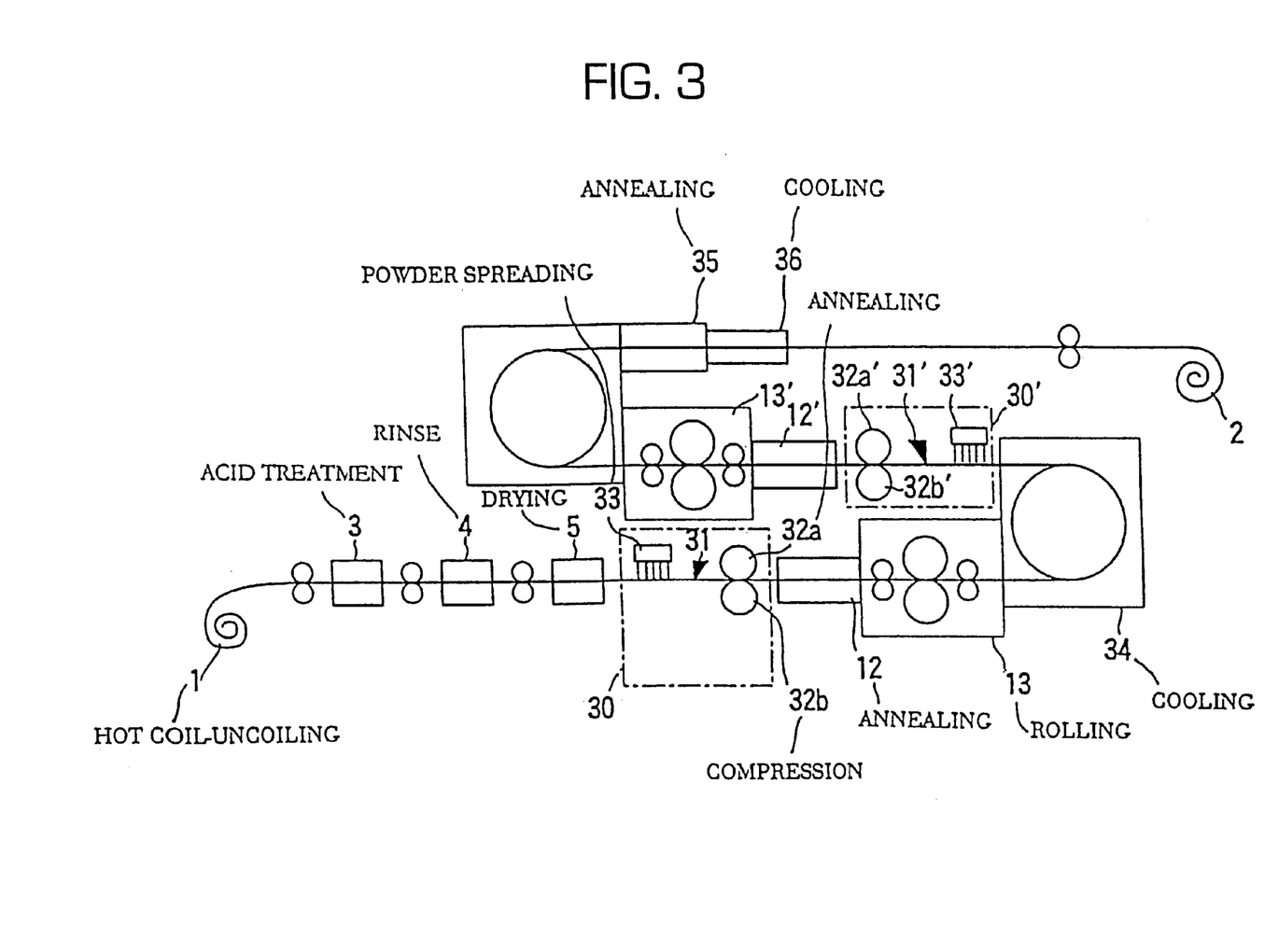
FIG. 3 is a schematic view showing a manufacturing apparatus of a second embodiment of the present invention.

FIG. 3 shows the second embodiment of the present invention. Similarly to the first embodiment, a metal layer consisting of Ni powder is formed on the surface of the hot-rolled plate (hot coil). The second embodiment is different from the first embodiment in that the Ni powder was applied to the surface of the hot-rolled plate not in the form of paste but spread thereon. The thickness of a metal powder layer is adjusted to a predetermined one by a doctor knife. The metal layer consisting of the Ni powder is also formed on the hot-rolled plate in the second embodiment. But needless to say, the above-listed metal powders which are used in the first embodiment may be used in the second embodiment.

The method of spreading metal powder is not limited to a specific method, but a sieve may be used to spread it or a shoot may be used to spread it between a pair of rollers.

In the second embodiment, as shown in FIG. 3, a hot-rolled steel plate is introduced into an acid treatment device 3 to remove oxidized scale from the surface of the plate. Then, the plate 1 is introduced into a rinse tank 4 to wash it with water and is dried in a drying oven 5. Then, the plate 1 is successively transported to a metal spreading device 30 in which the metal powder is spread on the upper surface of the plate 1 by using a spreading machine 33, then the thickness of the metal powder layer is adjusted to a predetermined thickness by a doctor knife 31. Then, the plate 1 is passed between a pair of compression rollers 32a and 32b vertically located to compress the spread metal powder.

Then, the plate 1 is introduced into an annealing oven 12 to sinter the metal powder at 600° C.–900° C. for one minute–30 minutes in a deoxidizing atmosphere ($N_2$:25%–99%, $H_2$:75%–1%). Successively, the plate 1 is rolled at rolling rate of 0.3%–10% in a rolling machine 13, then it is introduced into a cooling oven 34.

Then, the plate 1 is turned upside down to transport it with the lower surface thereof at the upper side thereof. In this state, the metal powder is deposited on the lower surface of the plate 1 in the same method as that used to deposit it to the upper surface thereof. That is, the plate 1 is introduced into a metal spreading device 30' to spread the metal powder to the lower surface thereof by a spreading machine 33'. Then, the thickness of the metal powder layer is adjusted to a required one by a doctor knife 31'. Then, the plate 1 is passed between a pair of compression rollers 32a' and 32b' vertically arranged to compress the metal powder. Then, the plate 1 is introduced into an annealing oven 12' to sinter the metal powder at 600° C.–900° C. for 1–30 minutes in a deoxidizing atmosphere ($N_2$:25%–99%, $H_2$:75%–1%). Then, the plate 1 is rolled at rolling rate of 0.3%–10% in a rolling machine 13' and then, introduced into an annealing oven 35 and a cooling oven 36 to adjust the temperature of the steel plate to 60° C. The plate having the Ni layer formed on both surfaces thereof is wound around a roll as a coil 2.

Then, the plate rewound from the coil 2 is introduced into a cold rolling device to roll it at rolling rate of 80%–90% until the plate is rolled to 103%–101% of the predetermined thickness of a final product.

After the plate is cold-rolled, the plate is introduced into an annealing oven for annealing (550° C.–800° C., 24 hours–48 hours) by the batch or for successive annealing (600° C.–900° C., 0.5 minutes–3 minutes) in a deoxidizing atmosphere. After the plate is annealed, the plate is rolled by a skin pass roller at rolling rate of 0.3%–3% so as to be a required thickness of 0.1 mm–0.8 mm. Then, the plate used a battery can-forming plate 20 is wound as a coil. Referring to FIG. 2, in the battery can-forming plate 20 which is manufactured by the method, a Ni plated layer (or layer of mixture of Ni and other metal) 23 is formed on either surface of a steel plate 21 through a diffusion layer 22. The thickness of the steel plate 21 is 0.1 mm–0.8 mm. The thickness of the diffusion layer 22 is 0.1 $\mu$m–3 $\mu$m. The thickness of the Ni-plated layer 23 formed on both surfaces of the steel plate 21 is 1 $\mu$m–5 $\mu$m.

Third Experiment

Slab formed by casting was hot-rolled to form a hot coil (a hot-rolled steel plate) having a thickness of 2.0 mm. Then, oxidized scale was removed from the hot-rolled plate by acid treatment. Then, the hot-rolled plate was washed with water and dried. Then, using a spreading machine, mixed metal powder consisting of Ni:98.7%, Fe:0.8%, B:0.2%, Ag:0.1%, and Mn:0.2% was spread on the surface of the hot-rolled plate at 180 g/m$^2$, and then, the thickness of a metal powder layer was adjusted by a doctor knife.

Then, the plate was annealed at 850° C. for three minutes in a deoxidizing gas consisting of $N_2$ at 80% and $H_2$ at 20%. Then, the plate was successively rolled at a rolling rate of 1% at 400° C. in a reducing atmosphere. Then, the plate was turned upside down to spread mixed metal power to the lower surface thereof by using a spreading machine in a method similar to the above. Then, the thickness of the metal powder layer was adjusted to a required one by a doctor knife. Then, the plate was annealed at 850° C. for three minutes in a reducing atmosphere. Then, the plate was successively rolled at a rolling rate of 1% in a reducing atmosphere at 400° C. by a rolling machine. Then, the plate was annealed again at 800° C. for two minutes in a reducing atmosphere. After the plate was cooled to adjust the temperature of the steel plate to 60° C., it was taken out to the atmospheric air. The thickness of the plate was 1.99 mm at this time.

The plate which having a thickness of 1.99 mm and having the Ni alloy layer formed on the surface thereof was cold-rolled at a rolling rate of 84.6% to adjust the thickness thereof to 0.306 m. Thereafter, the plate was annealed successively for one minute at 750° C. in a reducing atmosphere. Then, the plate was rolled by a skin pass roller at a rolling rate of 2% to obtain a final product, namely, a battery can-forming plate having a thickness of 0.3 mm. The thickness of the Ni alloy layer was 2.8 $\mu$m and that of the diffusion layer was 1.6 $\mu$m.

Figure 4:
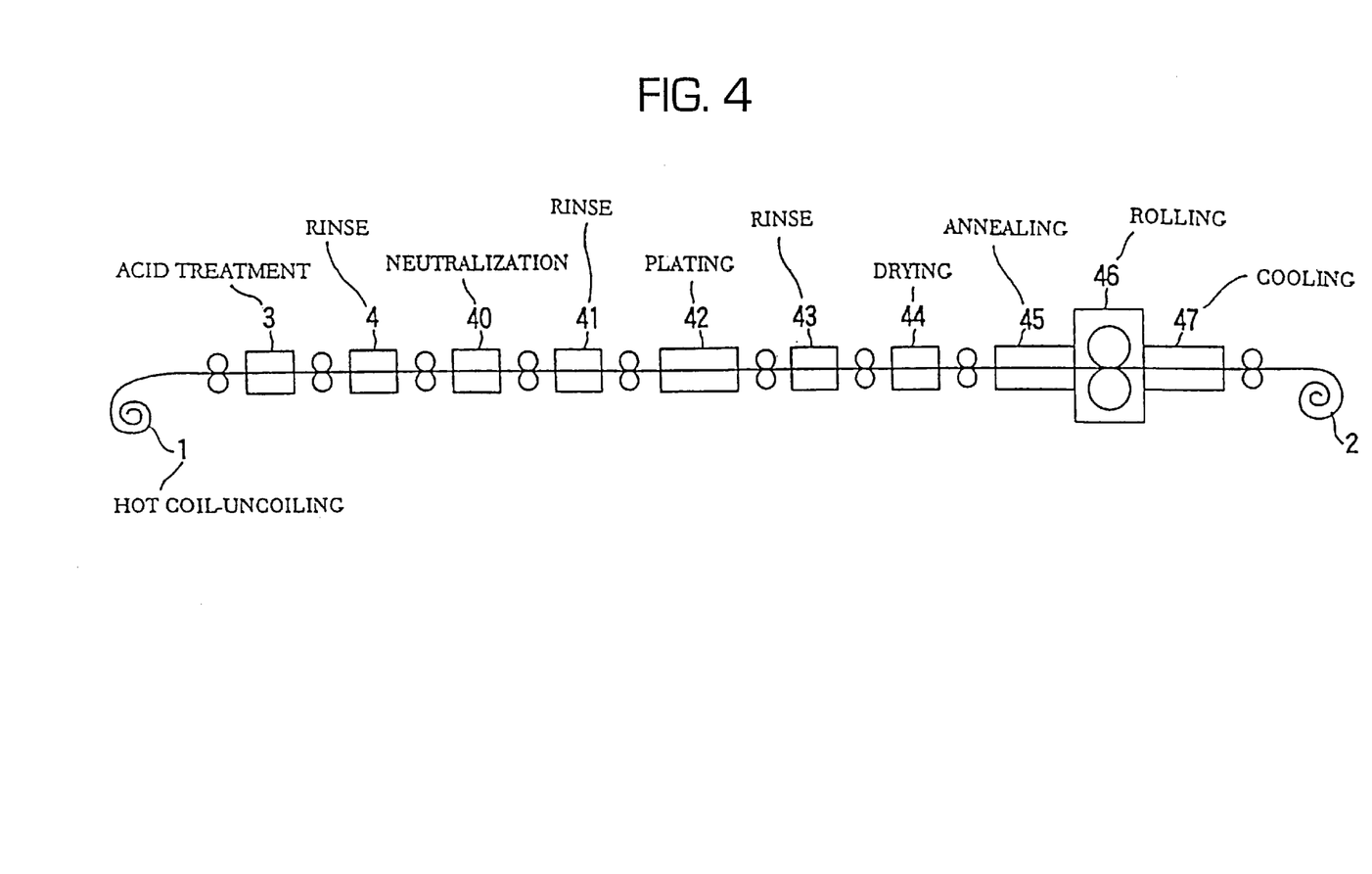
FIG. 4 is a schematic view showing a manufacturing apparatus of a third embodiment of the present invention.
Figure 5:
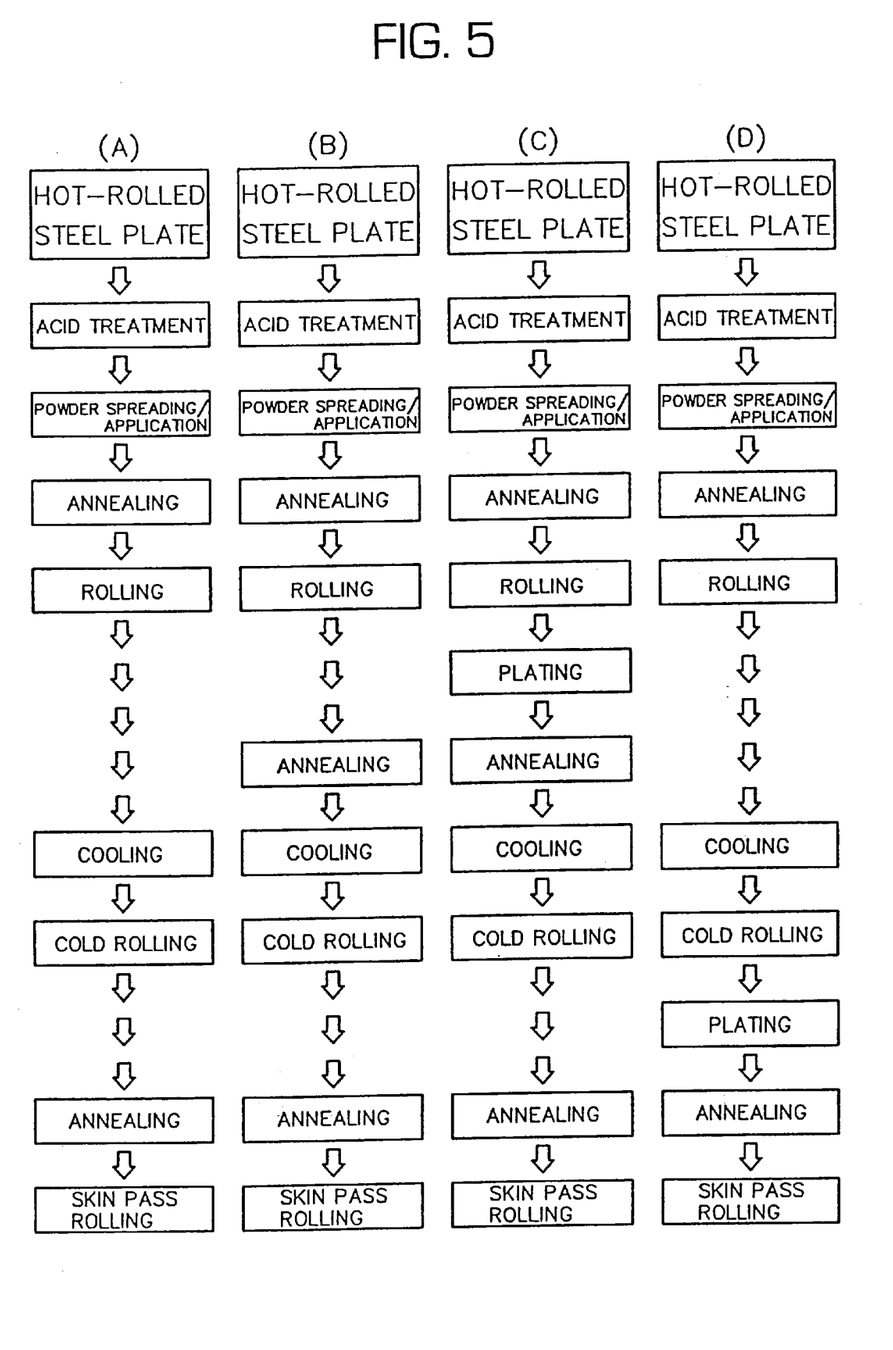
FIGS. 5A, 5B, 5C, and 5D are process views showing other manufacturing method of the present invention.
Figure 6:
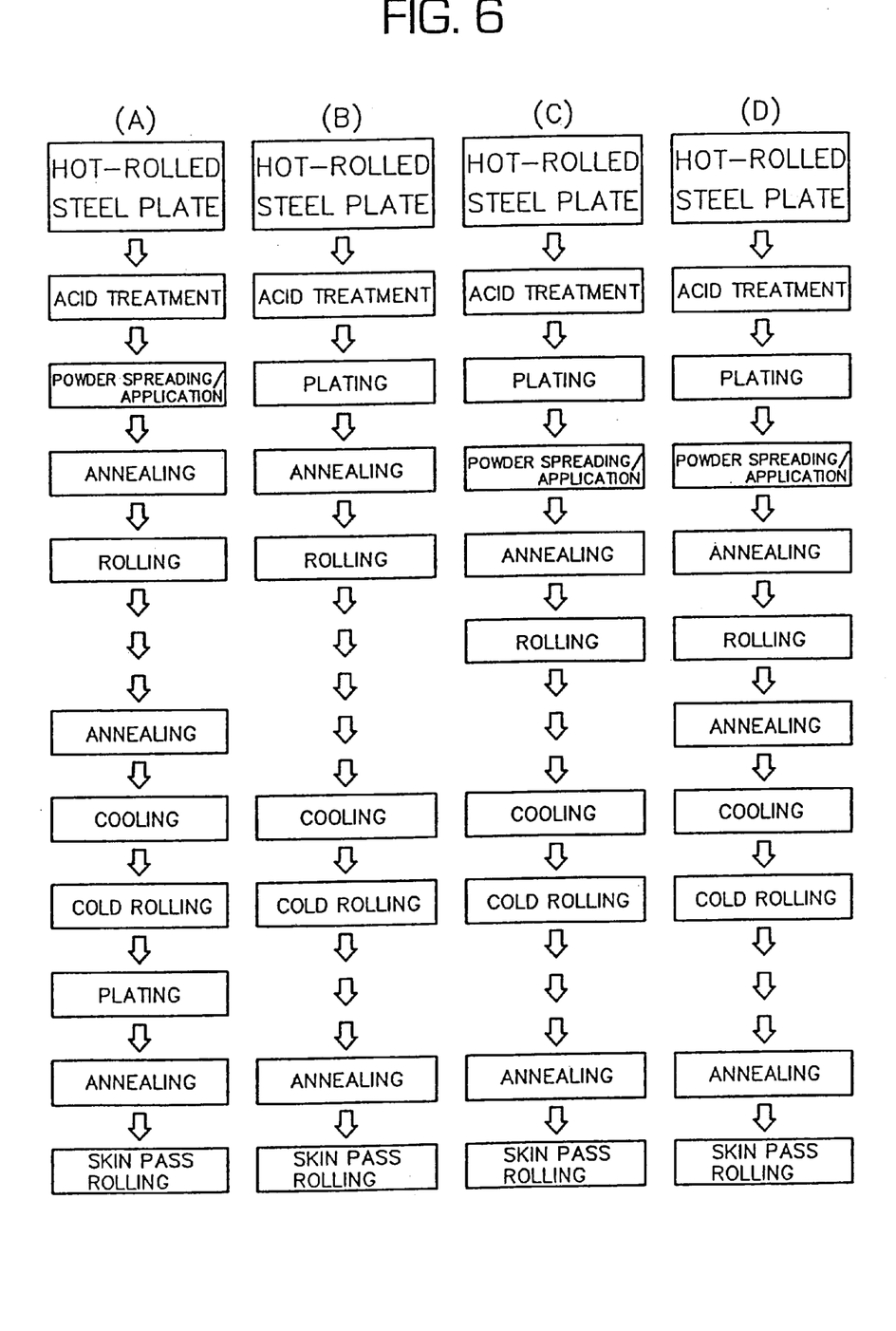
FIGS. 6A, 6B, 6C, and 6D are process views showing other manufacturing method of the present invention.

FIG. 4 shows the third embodiment of the present invention. The third embodiment is different from the first and second embodiments in that, instead of forming a metal layer consisting of metal powder on the surface of the hot-rolled steel plate, a plated layer (in the third embodiment, Ni-plated layer) is formed thereon by electroplating.

That is, a hot-rolled steel plate 1 is introduced into an acid treatment device 3 to remove oxidized scale formed on the surface thereof. Then, the hot coil 1 was washed with water in a rinse tank 4. After the plate 1 is introduced into a neutralizing device 40, it is introduced into a rinse tank 41. Then, it is introduced into a plating tank 42 to plate both surfaces of the hot-rolled steel plate 1. After the hot-rolled steel plate 1 is electroplated in the plating tank 42, it is washed with water in a rinse tank 43. Then, it is introduced into a drying oven 44 to dry it.

Then, the plate 1 having the metal plated thereon is annealed in a reducing atmosphere at 600° C.–900° C. Then, the plate 1 is rolled at the normal temperature—500° C. at rolling rate of 0.3%–5% in a rolling machine 46. Thereafter, the plate 1 is introduced into a cooling oven 47 to cool it. As a result, a plate having the Ni-plated layer thereon is formed.

When the plated metal layer is thin, it is unnecessary to anneal the plate. In the third embodiment, the steel plate is thick and the plated layer is also thick because the steel plate and the plated layer are cold-rolled after the steel plate is plated. Thus, the plated layer is liable to be separated from the steel plate. In order to prevent this, the diffusion layer is formed between the steel plate and the plated metal layer.

Then, the hot-rolled plate having the Ni plated layers on both surfaces thereof is introduced into a cold rolling device to roll it at rolling rate of 80%–90%, until the thickness of the plate is 103%–101% of the predetermined thickness of a final product.

After the plate is cold-rolled, the plate is introduced into an annealing oven for annealing (550° C.–800° C., 24 hours–48 hours) by the batch or successive annealing (600° C.–900° C., 0.5 minutes–3 minutes) in a deoxidizing atmosphere. After the plate is annealed, the plate is rolled by a skin pass roller at rolling rate of 0.3%–3% so as to be a required thickness of 0.1 mm–0.8 mm, then the plate used for a battery can-forming plate is wound as a coil. Referring to FIG. 2, in the battery can-forming plate 20 which is manufactured thus, a Ni-plated layer (or layer of mixture of Ni and other metal) 23 is formed on either surface of a steel plate 21 through a diffusion layer 22. The thickness of the steel plate 21 is 0.1 mm–0.8 mm. The thickness of the diffusion layer 22 is 0.1 $\mu$m–3 $\mu$m. The thickness of the Ni-plated layer 23 is 1 $\mu$m–5 $\mu$m.

Fourth Experiment

Iron slab formed by casting was hot-rolled to form a hot-rolled plate (hot coil) having a thickness of 2.67 mm. Then, oxidized scale was removed from the plate by acid treatment. Then, the plate was washed with water, neutralized, and washed. Then, the hot coil was Ni-plated in Watts bath to form a nickel-plated layer having a thickness of 22 $\mu$m on each of both surfaces (44 $\mu$m on both surfaces) thereof.

Then, the plate having the nickel-plated layer formed thereon was annealed in a deoxidizing gas consisting of $N_2$ at 80% and $H_2$ at 20% at 750° C. for three minutes. Then, using a rolling machine, the hot coil was successively rolled in a reducing atmosphere at 400° C. at a rolling rate of 2%. After the plate was cooled to adjust the temperature of the steel plate 60° C., it was taken out to the atmospheric air. The thickness of the plate was 2.66 mm at this time.

The plate having a thickness of 2.66 mm and the Ni layer formed on the surface thereof was cold-rolled at a rolling rate of 84.6% to adjust the thickness thereof to 0.41 m. Thereafter, the plate was annealed by the batch in a reducing atmosphere at 600° C. for 24 hours. Then, the plate was rolled by a skin pass roller at a rolling rate of 2.5% to obtain a final product, namely, a battery can-forming plate having a thickness of 0.4 mm. The thickness of the Ni layer was 3 $\mu$m and that of the diffusion layer was 1.4 $\mu$m.

The thickness of the battery can-forming plate manufactured by the method of the first through fourth experiments and the components thereof are as shown in table 2 shown below. The mechanical characteristics of each battery can-forming plate, namely, the YP (yield point), TS (tensile strength), EL (elongation), HR-30T (hardness) thereof, and the thickness of the diffusion layer thereof are also as shown in table 2.

In accordance with JIS Z 2371, the corrosion resistance test was carried out.

In order to carry out the method of testing the press drawing property, battery cans were formed of the battery can-forming plate of the first through fourth experiments of the present invention and that of the conventional examples 1 and 2 by using press drawing. That is, the battery cans were formed by using three kinds of drawing processes, namely, transfer drawing, DI (drawing and ironing), and drawing in combination of transfer drawing and DI.

In order to carry out the method of testing the separation property, the battery can-forming plates were bent by 360° three times to visually inspect the degree of separation of the metal layer formed on the surface of the steel plate.

Table 3 shown below shows the result of the corrosion test, the press drawing property test, and the separation property test. In the table 3, X indicates "worst", ◯ indicates "worse", o indicates "good", and ⊙ indicates "best". The separation property means the degree of adhesion between the steel plate and the nickel layer formed thereon. "Good separation" means that the steel plate and the nickel layer are not separated from each other but stably kept in an adhesive state.

TABLE 2

| | Components | | | | | |
|---|---|---|---|---|---|---|
| | Thickness (mm) | C (× 100) | Si (× 100) | Mn (× 100) | P (× 1000) | S (× 1000) | S.AL (× 1000) |
| Experiment 1 | 0.25 | 0.06 | 1 | 16 | 15 | 9 | 63 |
| Experiment 2 | 0.25 | 0.06 | 1 | 16 | 15 | 9 | 63 |
| Experiment 3 | 0.30 | 4 | 1 | 20 | 8 | 8 | 28 |
| Experiment 4 | 0.40 | 4 | 1 | 20 | 8 | 8 | 28 |

| | Mechanical Characteristics | | | | |
|---|---|---|---|---|---|
| | Y.P (N/mm$^2$) | T.S (N/mm$^2$) | E1 (%) | HR-30T | Diffusion Layer ($\mu$m) |
| Experiment 1 | 245 | 345 | 41 | 53 | 1.2 |
| Experiment 2 | 255 | 363 | 39 | 54 | 1.2 |
| Experiment 3 | 246 | 351 | 41 | 48 | 1.6 |
| Experiment 4 | 248 | 342 | 42 | 49 | 1.4 |

As shown in table 2, the yield point, tensile strength, and elongation of the battery can-forming plate of each of the first through fourth experiments were almost equal to those of a conventional battery can-forming plate manufactured by plating a cold-rolled steel plate having a final thickness and those of a battery can-forming plate manufactured by plating a cold-rolled steel plate and then annealing and rolling it to have a final thickness.

It was confirmed that the manufacturing method of the present invention, in which metal layer on the hot-rolled steel plate (hot coil) is formed by plating it directly or spreading metal powder thereon or coating metal powder on the hot-rolled steel plate, is more productive and much less costly than the conventional manufacturing method. Further, it was confirmed that the battery can-forming plate of the present invention have a quality similar to that of the battery can-forming plate manufactured by the conventional method.

Comparison tests were conducted on the battery can-forming plate of the first through fourth experiments, a conventional example 1 (nickel was plated on only iron plate), and a conventional example 2 (nickel was plated on iron plate, then the plate was annealed and rolled by skin pass roller) to compare the corrosion resistance, press drawing property, and separation property thereof.

TABLE 3

| | Corrosion Resistance | Press Drawing Property | Separation Property |
|---|---|---|---|
| Conventional example 1 | Δ | ◯ | ◯ |
| Conventional example 2 | ◯ | ◯ | ◯ |
| Experiment 1 | ◯ | ◯ | ⊙ |
| Experiment 2 | ◯ | ◯ | ⊙ |
| Experiment 3 | ◯ | ◯ | ⊙ |
| Experiment 4 | ⊙ | ◯ | ⊙ |

X . . . worst, Δ . . . worse, ◯ . . . good, ⊙ . . . best
Conventional example 1 (Nickel plating on iron plate)
Conventional example 2 (Nickel plating on iron plate☐Annealing☐Skin pass rolling)

As indicated in the table 3, the battery can-forming plate of each of the first through fourth experiments of the present invention was good in the corrosion resistance, the press drawing property, and the separation property and excellent in the separation property.

Figure 7:
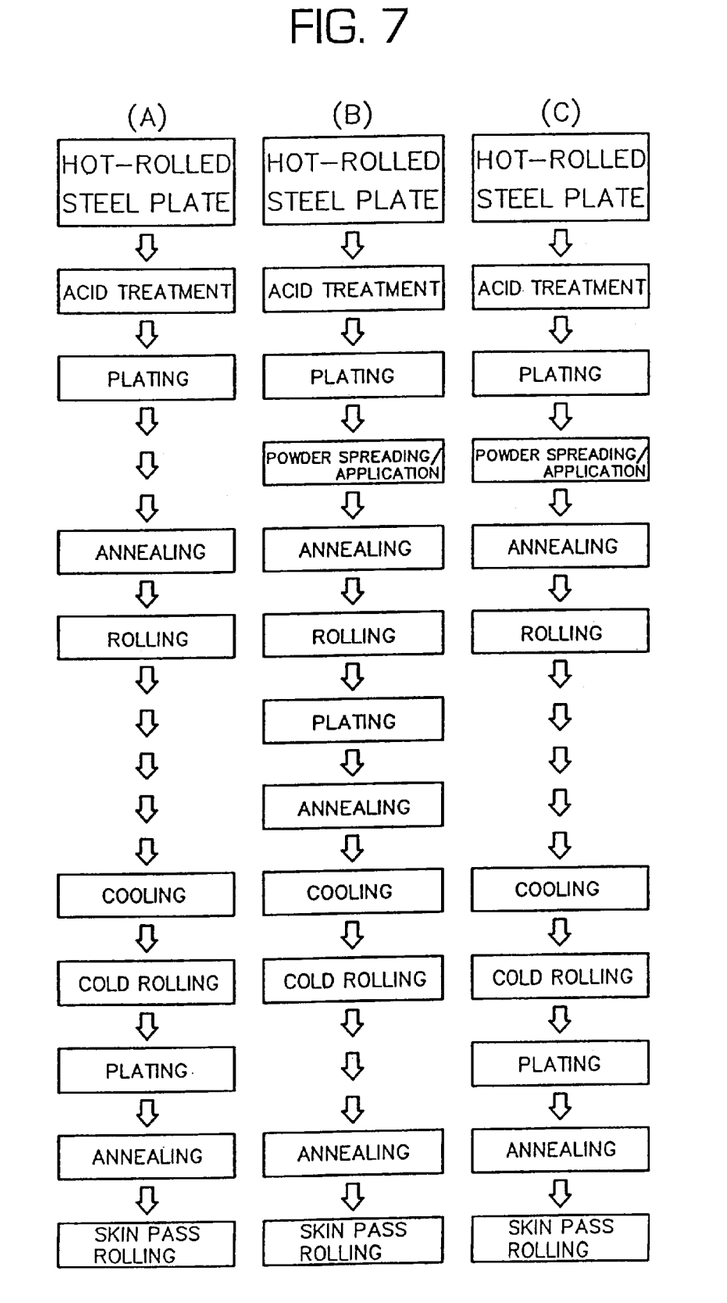
FIGS. 7A, 7B, and 7C are process views showing other manufacturing method of the present invention.
Figure 8:
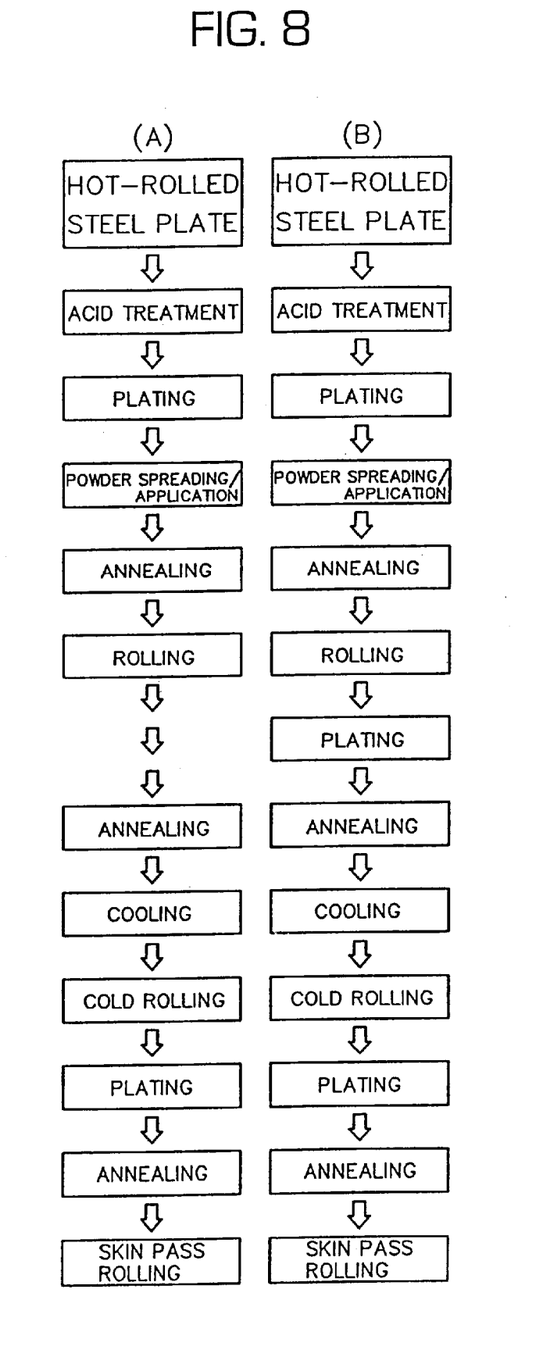
FIGS. 8A and 8B are process views showing other manufacturing method of the present invention.

The present invention is not limited to the first through third embodiments, the battery can-forming plate of the present invention can be manufactured by various processes as shown in FIGS. 5A, 5B, 5C, and 5D; FIGS. 6A, 6B, 6C, and 6D; FIGS. 7A, 7B, and 7C; and FIGS. 8A and 8B.

Although in each of the first through fourth embodiments, the metal layer which is formed on either surface of the hot-rolled plate consists of the same kind of metal, the layer which is formed on the upper surface thereof and that which is formed on the lower surface thereof may consist of different kinds of metal. For example, a Ni-plated layer may be formed on one surface thereof, whereas a layer of aluminum powder may be formed on the other surface thereof.

Further, different kinds of metal layers may be laminated on the surface of a steel plate. For example, a layer of aluminum powder may be formed on the surface of the nickel-plated layer. Furthermore, two or more metal layers may be laminated on each surface of the plate.

The battery cans were formed by using the known battery can-forming method, namely, transfer drawing, DI or drawing in combination of transfer drawing and DI. As confirmed in the test, because the battery can-forming plate of the present invention is preferable in press drawing property, it is superior in processability as well.

As apparent from the foregoing description, according to the present invention, replacing the conventional method of cold-rolling a hot-rolled steel plate (hot coil) to make the thickness thereof thin and plating the cold-rolled steel plate, metal powder is spread on the hot-rolled steel plate or applied thereto in the form of slurry to form a metal layer thereon. Therefore, the length per unit weight in the hot-rolled steel plate is shorter than that of the steel plate which is cold-rolled to a required thickness. The method of the present invention allows the surface area of the steel plate which is treated to be smaller than that of the steel plate which is treated by the conventional method, thus forming the metal layer consisting of metal powder or the plated metal layer in a short period of time. In result, the method of the present invention enhances the productivity, thus accomplishing a great deal of surface-treating operation in a short period of time.

In particular, when metal powder is spread on the hot-rolled steel plate or applied thereto in the form of slurry to form a metal layer thereon and plating operation is omitted, it is unnecessary to use a large plating apparatus and possible to consume no electric power. Therefore, the method of the present invention allows the battery can-forming plate to be manufactured with reducing cost much.

Further, in the present invention, the plated layer or/and the metal layer consisting of metal powder are formed on the surface of the steel plate, the only small area may be surface-treated. It allows the total manufacturing cost can be reduced by about 25% compared to that of the conventional method of surface-treating the cold-rolled steel plate.

Furthermore, in the present invention, a battery can-forming plate of the same thickness and width that the conventional battery can-forming plate has can be manufactured with reducing the required period to about ⅟₇ of the period by the conventional manufacturing method (after steel plate is hot-rolled, it is cold-rolled, and then, plated).

What is claimed is:

1. A method of manufacturing a battery can-forming plate, comprising the steps of:
    spreading metal powder on a hot-rolled steel plate or applying the metal powder in the form of paste to a surface thereof;
    annealing and then rolling the steel plate to form a metal layer consisting of the metal powder on the surface of the steel plate;
    cold-rolling the plate;
    annealing the plate; and
    rolling the plate by a skin pass roller.

2. The method of manufacturing a battery can-forming plate according to claim 1, wherein after the metal layer consisting of the metal powder is formed, annealing is performed again to form a diffusion layer between the steel plate and the metal layer or between the plated layer and the metal layer, and then the cold-rolling is performed.

3. The method of manufacturing a battery can-forming plate according to claim 1, wherein after the cold-rolling is performed, plating is performed, and then, annealing and skin pass rolling are performed.

4. The method of manufacturing a battery can-forming plate according to claim 1, wherein the metal powder consists of one of Ni, Al, In, Ca, Ag, Ge, Co, Sn, Sr, Se, Pb, Ba, Bi, Be, B, Mn, P, Cr, Si, C, Cu, Fe, Zn, La, W, Ti, Mo, Ga, an alloy thereof or a mixture of two or more these metals.

5. The method of manufacturing a battery can-forming plate according to claim 2, wherein after the cold-rolling is performed, plating is performed, and then, annealing and skin pass rolling are performed.

6. The method of manufacturing a battery can-forming plate according to claim 2, wherein the metal powder consists of one of Ni, Al, In, Ca, Ag, Ge, Co, Sn, Sr, Se, Pb, Ba, Bi, Be, B, Mn, P, Cr, Si, C, Cu, Fe, Zn, La, W, Ti, Mo, Ga, an alloy thereof or a mixture of two or more these metals.

7. The method of manufacturing a battery can-forming plate according to claim 5, wherein the plating is performed by using Ni or an alloy of Ni—Mn, Ni—In, Ni—Ag, Ni—Ge, Ni—Co, Ni—Sn, Ni—Se, Ni—B, Ni—P, Ni—Si, Ni—Fe, Ni—Zn, Ni—La, Ni—W, Ni—Ti, Ni—Mo, Ni—Ga, Co—Mo, Fe—W, or Ag—Sn.

8. A method of manufacturing a battery can-forming plate, comprising the steps of:
    plating a surface of a hot-rolled steel plate;
    annealing and then rolling the plate to form a diffusion layer consisting of iron of the steel plate and a metal plated between the steel plate and the plated layer;
    cold-rolling the plate;
    annealing the plate; and
    rolling the plate by a skin pass roller.

9. The method of manufacturing a battery can-forming plate according to claim 8, wherein after the cold-rolling is performed, plating is performed, and then, annealing and skin pass rolling are performed.

10. The method of manufacturing a battery can-forming plate according to claim 8, wherein the plating is performed by using Ni or an alloy of Ni—Mn, Ni—In, Ni—Ag, Ni—Ge, Ni—Co, Ni—Sn, Ni—Se, Ni—B, Ni—P, Ni—Si, Ni—Fe, Ni—Zn, Ni—La, Ni—W, Ni—Ti, Ni—Mo, Ni—Ga, Co—Mo, Fe—W, or Ag—Sn.

11. A method of manufacturing a battery can-forming plate, comprising the steps of:
    plating a surface of a hot-rolled steel plate;
    spreading metal powder on the plated layer or applying the metal powder in the form of paste thereto;
    annealing and then rolling the plate to laminate a metal layer consisting of the metal powder on the plated layer formed on the surface of the steel plate;
    cold-rolling the plate;
    annealing the plate; and
    rolling the plate by a skin pass roller.

12. The method of manufacturing a battery can-forming plate according to claim 11, wherein after the metal layer consisting of the metal powder is formed, annealing is performed again to form a diffusion layer between the steel plate and the metal layer or between the plated layer and the metal layer, and then the cold-rolling is performed.

13. The method of manufacturing a battery can-forming plate according to claim 11, wherein after the cold-rolling is performed, plating is performed, and then, annealing and skin pass rolling are performed.

14. The method of manufacturing a battery can-forming plate according to claim 11, wherein the metal powder consists of one of Ni, Al, In, Ca, Ag, Ge, Co, Sn, Sr, Se, Pb, Ba, Bi, Be, B, Mn, P, Cr, Si, C, Cu, Fe, Zn, La, W, Ti, Mo, Ga, an alloy thereof or a mixture of two or more these metals.

15. The method of manufacturing a battery can-forming plate according to claim 12, wherein after the cold-rolling is performed, plating is performed, and then, annealing and skin pass rolling are performed.

16. The method of manufacturing a battery can-forming plate according to claim 12, wherein the metal powder consists of one of Ni, Al, In, Ca, Ag, Ge, Co, Sn, Sr, Se, Pb, Ba, Bi, Be, B, Mn, P, Cr, Si, C, Cu, Fe, Zn, La, W, Ti, Mo, Ga, an alloy thereof or a mixture of two or more these metals.

17. The method of manufacturing a battery can-forming plate according to claim 15, wherein the plating is performed by using Ni or an alloy of Ni—Mn, Ni—In, Ni—Ag, Ni—Ge, Ni—Co, Ni—Sn, Ni—Se, Ni—B, Ni—P, Ni—Si, Ni—Fe, Ni—Zn, Ni—La, Ni—W, Ni—Ti, Ni—Mo, Ni—Ga, Co—Mo, Fe—W, or Ag—Sn.

* * * * *